Patented Mar. 2, 1943

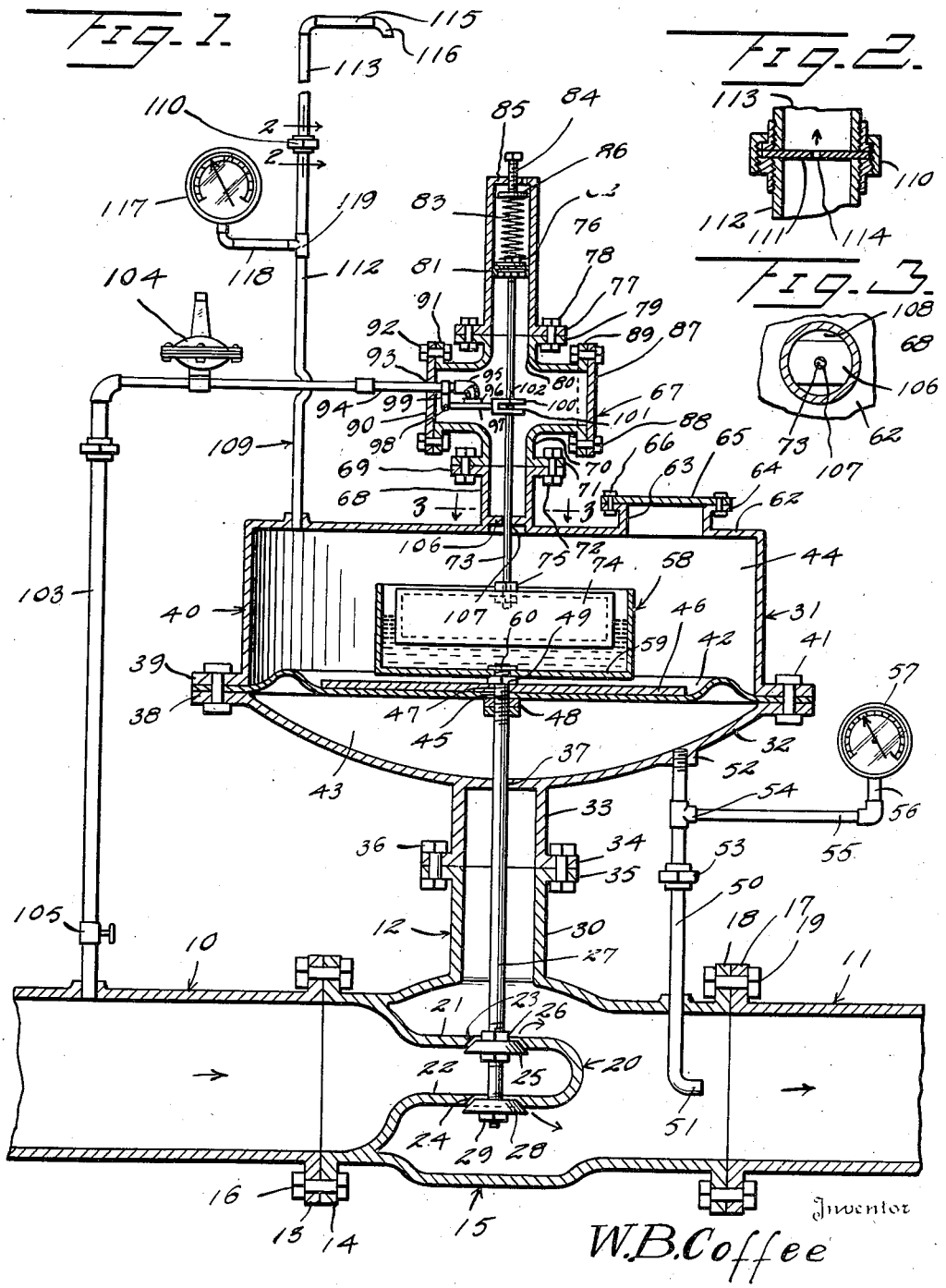

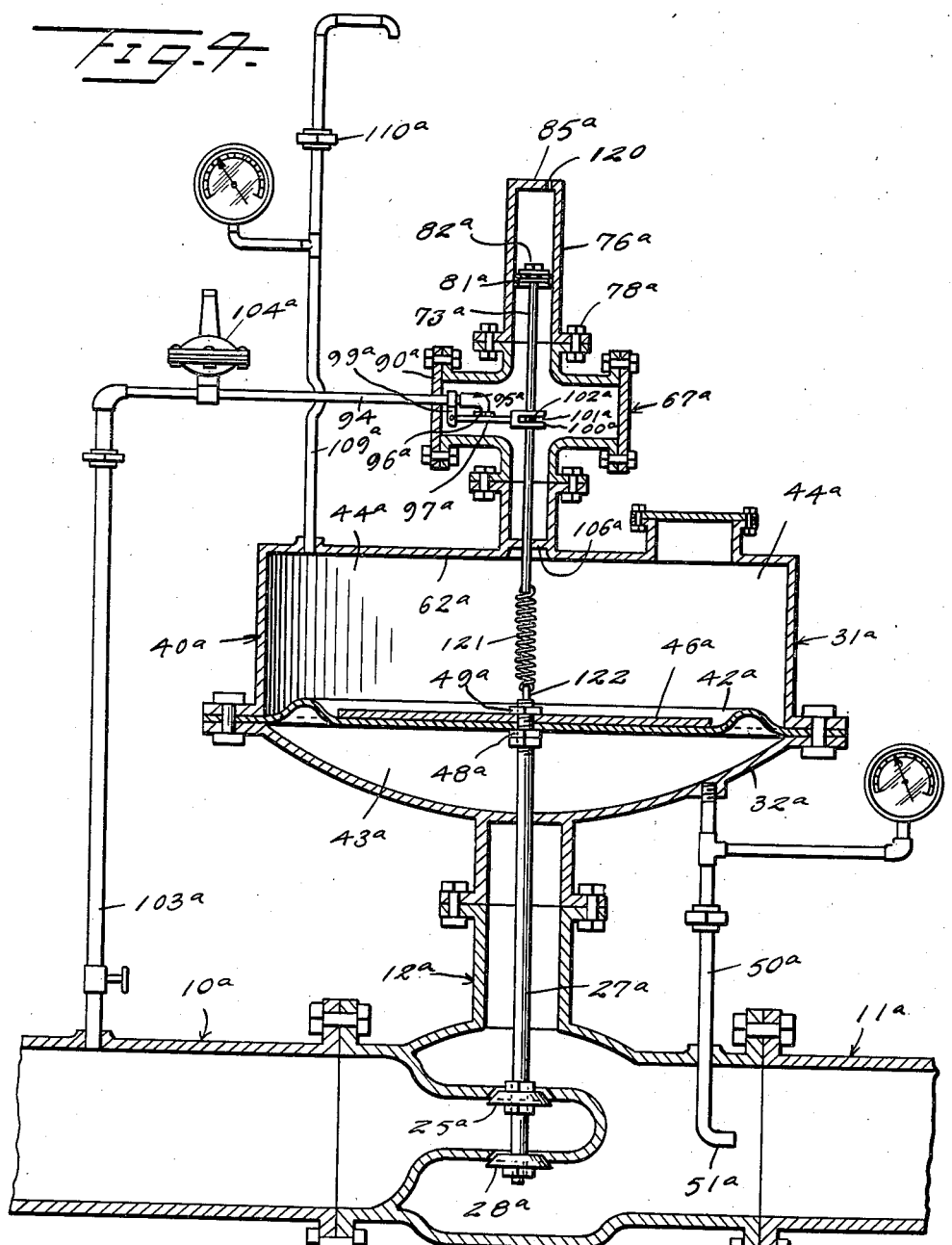

2,312,880

UNITED STATES PATENT OFFICE 2,312,880

RATIO CONTROLLER FOR GAS OR FLUID REGULATORS

William B. Coffee, Atlanta, Ga.

Application July 5, 1941, Serial No. 401,256

9 Claims. (Cl. 50—12)

This invention relates to automatically operable fluid pressure regulators.

An object of this invention is to provide an improved apparatus for effecting an increased pressure on the output side of a fluid regulating valve structure which is connected with a source of fluid pressure as the flow through the regulator is increased, and wherein the source of fluid pressure is correlated with the regulating structure to effect the desired result.

Another object of this invention is to provide an improved method of regulating the flow of fluid from a high pressure fluid source so that an increase in consumption of the fluid causing a drop in pressure will in itself effect an increased flow of fluid from the source through increased opening of the regulating valve.

A further object of this invention is to provide a fluid pressure regulator structure in combination with a flow regulating valve whereby the valve may be operated to proportion the passage of fluid in accordance with the consumption of the fluid and in this manner provide an even pressure on the output side of the valve.

A further object of this invention is to provide a structure of this kind which includes a counter controlling means for preventing undue opening of the regulating valve upon sudden drop of pressure at the output side of the valve so as to thereby eliminate any surging in the fluid pressure due to excessive opening of the regulating valve.

A further object of this invention is to provide an automatically operable structure of this kind including a manually adjustable valve tensioning means plus a lessening mercury buoyancy force for normally urging the valve to an open position and a pressure operated means connected with the high pressure side of the valve so that the movement of the valve to an open position beyond a predetermined point will be resisted by fluid pressure from the pressure source.

A further object of this invention is to provide in combination a pressure regulating valve structure of the diaphragm type and a controlling means therefor including a buoyant controller which is correlated with the high pressure side of the valve structure for affecting the buoyancy of the controller in proportion to the degree of opening of the valve structure.

A further object of this invention is to provide a pilot controlled valve structure which is flexibly connected with the main valve operating structure and which regulates the opening and closing of the main valve structure in proportion to the fluid pressure on the output side of the main valve structure.

A further object of this invention is to provide in combination a main valve structure, spring-pressed means for urging the valve to an open position, a diaphragm connected with the valve and with the low pressure side thereof for moving the valve toward closed position in proportion to the fluid pressure on the low pressure side and a pilot means correlated with the diaphragm and the high pressure side of the valve and including a liquid receptacle carried by the diaphragm with a float positioned in the receptacle and connected with the spring-pressed means for controlling the action of the latter to thereby provide for the desired flow of fluid through the valve structure.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a vertical sectional view partly in detail of a ratio controller for a gas regulator constructed according to an embodiment of this invention, Figure 2 is a fragmentary sectional view taken on the line 2—2 of Figure 1, Figure 3 is a section view taken on the line 3—3 of Figure 1, and Figure 4 is a vertical sectional view partly in detail of a modified form of this invention.

Referring to the drawings the numeral 10 designates a high pressure fluid pipe line through which a gas or other fluid is adapted to flow from a supply source and the numeral 11 designates a low pressure pipe line which is adapted to be connected with the high pressure line 10. A valve structure generally designated as 12 is interposed between the adjacent ends of the two pipes 10 and 11, the pipe 10 having a flange 13, which confronts a flange 14 carried by one end of the valve housing 15. Fastening devices 16 secure the two flanges 13 and 14 together. The pipe 11 is provided with a flange 17 and the housing 15 is formed with a confronting flange 18, which is adapted to be secured to the flange 17 by fastening devices 19.

The valve housing 15 includes a substantially

U-shaped wall 20 having the legs or sides 21 and 22 thereof disposed in spaced apart relation and each formed with valve seats 23 and 24 respectively. An upper valve member 25 is secured by fastening members 26 to a vertically disposed valve stem 27 and a lower valve member 28 is secured by fastening devices 29 to the lower end of the valve stem 27. The valve member 25 is adapted when in port closing position to engage on the seat 23 and the valve member 28 is adapted when in port closing position to engage on the seat 24.

The two valve members 25 and 28 are spaced apart a distance such that in port closing position the two valves 25 and 28 will be engaged with their respective seats at the same time. Conversely when the valve stem 27 is moved to a position for opening the valve structure the two valve members 25 and 28 will be simultaneously moved to an open position. The valve housing 15 has formed therewith a cylindrical nipple or extension 30, which extends upwardly and about the valve stem 27. A diaphragm or valve operator housing generally designated as 31 is disposed above the extension 30, the housing 31 being formed with a lower dished housing member 32, which has secured thereto or formed integrally therewith a downwardly extending nipple 33 which engages about the valve stem 27 and is formed at its lower end with a flange 34. The upper end of the extension 30 is also formed with a flange 35 and the two flanges 34 and 35 are secured together by fastening devices 36. The lower housing member 32 is formed centrally thereof with an opening 37 through which the valve stem 27 slidably engages.

The lower housing member 32 is provided with a marginal and horizontally disposed flange 38, which is adapted to confront a flange 39 carried by the upper housing member 40 which extends above the lower housing member 32. The two housing members 32 and 40 are secured together by fastening devices 41 which engage through the flanges 38 and 39. A flexible diaphragm 42 is interposed between the flanges 38 and 39 and divides the housing member 31 into a lower chamber 43 and an upper chamber 44. The valve stem 27 extends through an axially disposed opening 45 formed in the center of the diaphragm 42 and a disk or plate 46 having a central opening 47 also engages about the valve stem 27 on the upper side of the diaphragm 42. A lower nut 48 is threaded onto the stem 27 and bears against the under side of the diaphragm 42 whereas an upper nut 49 is threaded onto the stem 37 and bears against the plate or disk 46 so as to tightly hold the plate and diaphragm together.

The low pressure side of the housing 15 on the output side of the valve members 25 and 28 has extended thereinto a fluid conducting pipe 50 which is formed at its lower or inner end with a right angular extension 51 disposed coaxial with the housing 15 so that the pressure of gas or fluid on the output side of the valve structure will extend into the pipe 50. The lower housing member 32 is formed with a boss 52 into which the upper end of the pipe 50 extends so that the pressure of gas or fluid in the pipe 50 will be communicated to the lower fluid chamber 43. A union 53 is interposed between the ends of the pipe 50 so if desired the housing structure 31 may be separated from the valve housing 15 by loosening the fastening devices 36 and the union 53. A T-shaped coupling 54 is also interposed in the pipe 50 and has secured thereto a laterally extending pipe 55. The pipe 55 has a vertically disposed extension 56 with which a pressure gauge 57 is connected so that the pressure of gas or fluid in the pipe 50 may be visibly determined.

It will be understood that the gauge 57 may only be used as a temporary testing means which may be subsequently removed in order that the hereinafter described pilot structure may be adjusted to obtain the desired fluid pressure on the output side of the valve housing 15 and within the lower pressure pipe 11. An upwardly opening liquid receptacle 58 has the bottom wall 59 thereof secured by fastening means 60 to the upper end of the stem 27. The receptacle 58 is positioned within the upper chamber 44 of the housing 31 and is adapted to have a liquid 61 in the form of mercury or the like positioned therein. The upper housing member 40 has secured to the upper wall 62 thereof a cylindrical extension 63, which is disposed in offset relation to the axial center of the housing member 44 and the extension 63 is formed with an upper flange 64 on which a closure plate 65 is adapted to be secured by fastening devices 66. In this manner after the receptacle 58 and the other parts disposed within the housing structure 31 are adjusted the liquid 61 may be placed within the receptacle 58. The closure plate 65 also may be removed for inspection purposes.

A pilot housing generally designated as 67 is disposed above the upper housing member 40. The upper housing member 40 is provided with a cylindrical extension 68, which is provided with a flange 69 at its upper end. The pilot housing 67 is formed with a cylindrical downwardly extending nipple 70 formed with a flange 71 which is secured by fastening devices 72 to the flange 69. A vertically disposed plunger rod 73 extends axially through the nipple or extension 68 and the nipple 70 and terminates at its lower end in the upper chamber 44. A float member 74 is secured by fastening devices 75 to the lower end of the plunger rod 73 and the float 74 is of a diameter substantially less than the diameter of the liquid receptacle 58 as shown in Figure 1.

A cylinder 76 extends upwardly from the pilot housing 67 and is formed at its lower end with a flange 77 which is secured by fastening devices 78 to a flange 79 carried by an upwardly extending nipple 80 formed integrally with the housing 67. The rod 73 extends axially into the cylinder 76 and has secured to the upper end thereof a plunger 81 as by fastening devices 82. A spring 83 is loosely disposed in the cylinder 76 and bears at its lower end against the upper side of the plunger 81. A spring tensioning bolt 84 is threaded through the upper wall or head 85 of the cylinder 76 and bears against a plate 86, which is interposed between the lower or inner end of the bolt 84 and the upper end of the spring 83. The spring 83 is adapted to constantly urge the plunger 81 downwardly so as to place the desired pressure on the float 74 and in like manner to place the diaphragm 42 under the desired pressure for urging the valve members 25 and 26 to an open position.

The pilot housing member 67 includes a head or inspection plate 87, which is secured by fastening devices 88 to a flange 89 formed integral with the housing member 67. A second head 90 is disposed opposite from the head 87 and engages against a flange 91 to which the head 90 is secured by fastening devices 92. The head 90 is formed with an opening 93 through which a pipe 94 extends. The pipe may be secured and sealed to head 90 by welding or the like. The inner end of the pipe 94 has secured thereto an L-shaped valve member or housing 95 which opens downwardly and a valve plug or flapper member 96 which is carried by a vertically rockable valve operating member 97 is adapted to engage against the lower open end of the housing 95. One end of the lever 97 is pivotally mounted as at 98 on a bracket 99, which is fixed about the pipe 94 inwardly from the head 90. The other end of the lever 97 is bifurcated so that the bifurcated portion 100 of the lever 97 may loosely extend about the plunger rod 73. Each arm or bifurcation of the lever 97 is formed with a slot 101 between which a pin 102 loosely engages. The pin 102 extends horizontally through the rod 73 so that vertical movement of the rod 73 will also effect vertical movement of the lever 97. The pipe 94 is provided with a right angularly disposed branch 103, which is connected to the high pressure pipe 10 on the input side of the valve housing 15. A pressure reducing valve structure 104 is interposed in the pipe 94, so that the desired pressure from the pipe 10 may be discharged into the pilot housing 67.

A cut-off valve 105 is interposed in the branch 103 between the pressure reducing valve structure 104 and the pipe 10. The pressure reducing valve structure 104 is of conventional construction and it is believed that it is unnecessary to describe the detailed construction of this reducing valve structure. The vertically disposed nipple or extenture 68 is provided adjacent the lower end thereof with a transversely extending plunger rod guide member or bar 106 having an opening 107 through which the plunger rod 73 slidably engages. The bar 106 forms passages 108 on the opposite edges thereof through which the fluid from the housing 67 is adapted to pass downwardly to the upper chamber 44. The area of passages 108 determines the rate of boosting of outlet pressure in line 11.

A vertically disposed pressure relieving pipe 109 is connected at its lower end to the top wall 62 of the upper housing 40 and the pressure relieving pipe 109 has interposed in the length thereof a union 110. A disk or plate 111 extends across the union 110 between the adjacent ends of the pipe sections 112 and 113, which are formed by cutting the pipe 109. The disk or plate 111 is provided axially thereof with a relatively small opening or vent 114, so that the fluid pressure from the upper chamber 44 will be gradually dissipated through the vent 114 and from the upper pipe section 113 into a horizontally disposed pipe 115, which is connected to the upper end of the pipe section 113.

A downwardly directed L 116 is connected to the horizontal pipe section or branch 115 and opens into the atmosphere for permitting the gas or fluid pressure to be discharged into the atmosphere at the desired rate. A gauge 117 is connected to a branch 118 which is connected to a coupling 119 interposed in the lower pipe section 112. The gauge 117 may only be used during the initial adjustment of the spring 83 and the quantity of liquid 61 in the receptacle 58. The gauge 117 will provide a means whereby the pressure in the chamber 44 and in the pilot housing 67 may be readily determined so that the reducing valve 104 may if desired be adjusted in order to provide for the necessary fluid pressure in the chamber 44 and in the pilot housing 67 when the flapper valve 96 is moved to an open position.

Referring now to Figure 4, there is disclosed a modified form of regulator structure which includes a valve structure 12$^a$ similar in every detail to the valve structure 12, which is interposed between a high pressure pipe 10$^a$ and a low pressure pipe 11$^a$. The valve structure 12$^a$ includes a pair of valve members 25$^a$ and 28$^a$ which determine the quantity of fluid flowing from the pipe 10$^a$ to the pipe 11$^a$. The valve members 25$^a$ and 28$^a$ are secured to the lower end of a valve stem 27$^a$ and the valve stem 27$^a$ is secured centrally of a diaphragm 42$^a$ which is mounted in a diaphragm housing 31$^a$. The diaphragm housing 31$^a$ includes a lower housing member 32$^a$ and an upper housing member 40$^a$. A pipe 50$^a$ is connected at its upper end to the lower housing member 32$^a$ and the lower end of the pipe 50$^a$ terminates within the output side of the valve structure 12$^a$, being provided with a forwardly directed extension 51$^a$. The pipe 50$^a$ is designed for the purpose of communicating the pressure in the output side of the valve structure 12$^a$ to the lower chamber 43$^a$ in the housing 31$^a$.

A pilot structure 67$^a$ is secured to the top wall 62$^a$ of the upper housing member 40$^a$ and the pilot 67$^a$ is formed similar in every detail to the housing member 67$^a$. A cylinder 76$^a$ is secured by fastening devices 78$^a$ to the upper portion of the pilot member 67$^a$ and is formed at its upper end with a head or top wall 85$^a$ having a vent 120 therein. A plunger 81$^a$ is slidable in a cylinder 76$^a$ and has secured thereto by fastening devices 82$^a$ a plunger rod 73$^a$. The plunger rod 73$^a$ extends downwardly through the pilot housing 67$^a$ and is slidable in a horizontally disposed guide member 106$^a$ similar to the guide member 106 shown in greater detail in Figure 3. The guide member 106 is constructed in the form of a transversely extending bar which forms a pair of opposed fluid passages which communicate the pressure from the interior of the housing 67$^a$ to the upper chamber 44$^a$ formed above the diaphragm 42$^a$. A spring 121 is connected at its upper end to the lower end of the plunger rod 73$^a$ and the opposite or lower end of the spring 121 is connected to an eye 122 carried by the upper end of the valve stem 28$^a$.

A plate 46$^a$ is carried by the upper side of the diaphragm 42$^a$ being secured thereto by a lock nut 49$^a$ and preferably a pair of nuts 48$^a$ are threaded onto the stem 27$^a$ and engage against the lower side of the diaphragm 42$^a$. The plate 46$^a$ may be made relatively heavy so as to gravitatingly urge the diaphragm to flex downwardly and hold the valve members 25$^a$ and 28$^a$ in a normally open position. A valve structure 95$^a$ is disposed within the pilot housing 67$^a$ and is connected by means of a pipe 94$^a$ to a pipe 103, which is connected to the pipe 10$^a$. A reducing valve structure 104$^a$ is interposed in the pipe 94 so as to provide a reduced pressure in the valve structure 25$^a$. A valve member 96$^a$ is secured to a rock lever 97$^a$ mounted on a support 99$^a$ and the inner end portion of the lever 97$^a$ is formed with a bifurcated head 100 and the opposite arms of the head 100 are also bifurcated as at 101$^a$ and a pin 102$^a$ carried by the plunger rod 73$^a$ loosely engages between the bifurcations 101$^a$. A pressure relief pipe 109$^a$ is connected at one end ot the top wall 62$^a$ of the upper housing member 40$^a$ and has interposed therein a bleed structure 110$^a$ similar to the structure shown in Figure 2 for gradually relieving the fluid pressure from the chamber 44ª.

In the use and operation of the pressure regulating means of Figure 1 the valve structure 12 is adapted to be interposed between the high pressure pipe 10 and the low pressure pipe 11. The by-pass pipe 103 is connected with the high pressure pipe 10 and the spring 83 is tensioned by means of the spring tensioning bolt 84, so as to provide the desired pressure on the float or hollow body 74 in the liquid 61, which is positioned in the upwardly opening receptacle 58. The pressure of the spring 83 will constantly urge the valve stem 27 downwardly to a valve opening position to permit the pressure of fluid, such as gas or the like, to flow from the high pressure pipe 10 to the low pressure pipe 11. It is well known in gas supply lines that at certain periods there is an abnormal increase in the consumption of gas and this increase of consumption has the effect of materially reducing the gas pressure in the distant end of low pressure pipe 11. The pressure in the pipe 11 is maintained at a substantially constant pressure by means of the pipe 50, which communicates the fluid pressure from the pipe line 11 to the lower diaphragm chamber 43. In the event the pressure in the chamber 43 drops below a predetermined degree the tension of the spring 83 will force the valve stem 27 with the valves 25 and 28 downwardly to a greater open position so as to permit the pressure from the pipe 10 to pass into the pipe 11. At the same time that the valves 25 and 28 are moved downwardly to an open position the plunger rod 73 is moved downwardly so as to move the flapper valve member 96 to an open position. At this time the pressure in the pipe 94 determined by the pressure reducing valve 104 will enter the pilot housing 67 and will also pass downwardly into the upper diaphragm chamber 44.

The pressure of gas from the pipe 94 will have the effect of also resisting the downward movement of the plunger 81 and counteract to a predetermined degree the downward force of the spring 83 and the lessening buoyancy force on the float, so that the valves 25 and 28 will not be opened to a too great position. This will prevent the sudden flow of gas from the high pressure line 10 to the low pressure line 11. The pressure of the gas in the upper chamber 44 will also have an effect on the downward movement of the diaphragm 42, so as to hold this diaphragm in a lower valve opening position and in this manner there will be a downward movement of the liquid receptacle 58 with respect to the flat 74 until the pressures in the two chambers 43 and 44 are substantially equalized. The gas or pressure in the upper chamber 44 is lessened by bleed gradually through the exhaust pipe 109, which permits cushioned rising of diaphragm 42 and closer position of valves 25 and 28 to respective seats when flow downwardly decreases, the rate of exhaust being controlled by the size of the vent opening 114.

During the normal operation of this valve structure the flapper valve 96 will be in a closed position so that the valve members 25 and 28 will be moved to either open or closed position by the spring 83 and buoyancy-force change or the pressure of the gas in the lower diaphragm 43 respectively. The tension of the spring 83 is so adjusted as to provide the desired minimum loaded delivery pressure in line 11, and the lessening buoyancy force of mercury on the float as the pot and diaphragm 42 drop away causes increased pressure to be built up in pilot chamber 67 depending upon position of diaphragm 42 and hence valves 25 and 28, which action results in increased pressure build-up in chamber 44 and opens wider valves 25 and 28 supplying gas to cause a build-up of pressure in line 11 corresponding to reference position of mercury level on float and existing buoyancy force by mercury on float for that particular mercury level.

These correlated actions result in final object result of device, namely, the ratio controller boosts the delivery pressure in line 11 in ratio to the degree of opening of valves 25 and 28 in amount depending upon the corresponding buoyancy force of the mercury on the float for any particular degree of opening existing in valves 25 and 28. Whence the minimum delivery of fluid pressure would exist in line 11 when valves 25 and 28 are in closed position upward, and the maximum delivery pressure would exist in line 11 when valves 25 and 28 are in fully open position downward. Definite other delivery pressures in line 11 would exist between these maximum and minimum limits for corresponding definite positions of valves 25 and 28 between fully open and closed positions which in turn depend upon the load flow demand through line 11.

The passages 108 on the opposite sides of the plunger rod guide bar 106 may be formed of such a size as to provide for the gradual release of the gas pressure in the housing 67, so that the pressure of the gas in the housing 67 which is formed by the discharge of gas through the pipe 94 and the flapper valve 96 will move the plunger 81 upwardly so as to raise the float 74 and thus permit the fluid pressure in the lower chamber 43 to move the valve members 25 and 28 toward port closing position. The effect of this is to prevent undue opening of the valve members 25 and 28 and eliminate sudden release of high pressure from the high pressure pipe 10 to the low pressure pipe 11.

In addition to the diaphragm 42 being constantly urged downwardly to a valve opening position by means of the spring 83, this diaphragm 42 is urged downwardly to a greater valve opening position when the pressure in the lower chamber 43 drops below a normal pressure by opening of the valve structure 95. The reducing valve structure 104 will permit a pre-determined reduced pressure of fluid to enter the pilot housing 67 when the valve member 96 is in an open position and this reduced pressure will enter the upper chamber 44 through the passages 108 in the guide 106. The valves 25 and 28 will thus be held in the desired open position until a counterbalancing pressure is communicated to the lower diaphragm chamber 43 which will counterbalance the pressure in the upper chamber 44. As the pressure in the lower chamber 43 increases, the diaphragm 42 will be raised and the valve member 96 will be moved to a closing position to cut off the pressure from the pipe 103 which flows through the reducing valve structure 104.

In the operation of the modified form of regulator shown in Figure 4, the weight of the plate 46ª will determine the normal open position of the valve members 25ª and 28ª. In the event there is a drop in pressure in the lower chamber 43ª the valve members 25ª and 28ª will be moved to a more fully open position, and at the same time that the valve members 25ª and 28ª are moved to a more fully open position by downward flexing of the diaphragm 42ᵃ under the action of the weight 46ᵃ, the plunger rod 73ᵃ will be pulled downwardly thereby swinging the lever 97ᵃ downwardly and moving the valve member 96ᵃ to an open position. When the valve member 96ᵃ is in an open position, the pressure from the pipe 94ᵃ will enter the pilot housing 67ᵃ and will move the plunger 81ᵃ upwardly. Upward movement of the plunger 81ᵃ will draw the plunger rod 73 upwardly and tension the spring 121ᵃ, so as to thereby yieldably move the diaphragm 42ᵃ upwardly and also move the valve members 25ᵃ and 28ᵃ toward closing position. The amount of pressure which may enter the pilot housing 67ᵃ will be determined by the degree of opening of the valve member 96ᵃ and the holding of this pressure in the housing 67ᵃ will be determined by the size of the passages formed on the opposite edges of the plunger rod guide member 106ᵃ.

When a normal flow of fluid is reestablished in the pipe 11ᵃ and the pressure is normal, this normal pressure will be communicated to the lower pressure chamber 43ᵃ so as to hold the diaphragm 42ᵃ in a substantially balanced position with the valve members 25ᵃ and 28ᵃ in a predetermined open position. At this time, the valve member 96ᵃ will be in a closed position, which is the position shown in Figure 4. The vent 120 in the top wall 85ᵃ is provided for the purpose of permitting the entrance and release of air in the cylinder 76ᵃ above the plunger 82ᵃ.

What I claim is:

1. A pressure regulating apparatus comprising a valve housing for positioning between high and low pressure pipe lines, valve means in said housing, a valve operator housing carried by said valve housing, a diaphragm in said operator housing dividing the latter into a lower chamber and an upper chamber, means connecting said diaphragm with said valve means, a pipe connecting the output side of said valve housing with said lower chamber whereby the fluid pressure in said lower chamber will flex said diaphragm upwardly to thereby move said valve means toward closing position, a liquid receptacle fixed to said diaphragm and positioned in said upper chamber, a liquid in said receptacle, a float in said liquid, and spring-pressed means above said diaphragm connected with said float and said high pressure line for regulating the buoyancy of the latter and for controlling the downward flexing of said diaphragm toward valve opening position.

2. A pressure regulating apparatus comprising a valve housing for positioning between high and low pressure pipe lines, valve means in said housing, a valve operator housing carried by said valve housing, a diaphragm in said operator housing dividing the latter into a lower chamber and an upper chamber, means connecting said diaphragm with said valve means, a pipe connecting the output side of said valve housing with said lower chamber whereby the fluid pressure in said lower chamber will flex said diaphragm upwardly to thereby move said valve means toward closing position, a liquid receptacle fixed to said diaphragm and positioned in said upper chamber, a liquid in said receptacle, a float in said liquid, spring-pressed means connected with said float and said high pressure line for regulating the buoyancy of the latter and for controlling the downward flexing of said diaphragm toward valve opening position, and means connected with said spring-pressed means and said high pressure pipe line for cushioning the operation of said spring-pressed means.

3. In combination a fluid pressure regulating valve structure for interposition between a high pressure line and a low pressure line and including a valve member for communicating said lines with each other, a valve operator housing, a diaphragm dividing said housing into a lower chamber and an upper chamber and connected to said valve member, a pipe communicating said lower chamber with the output side of said valve structure, an upwardly opening receptacle in said upper chamber, means securing said receptacle to said diaphragm, a liquid in said receptacle, a float engaging in said liquid, tensionable means fixed to and extending upwardly from said float for normally urging said float downwardly to thereby maintain said valve member to a predetermined open position, a piston carried by said tensionable means and movable therewith, a second valve connected with said high pressure line, and means connecting said latter valve with said tensionable means whereby movement of said tensionable means toward valve opening position will open said second valve and the pressure from said high pressure line will act on said piston to thereby retard the movement of said tensionable means toward valve opening position.

4. In combination a fluid pressure regulating valve structure for interposition between a high pressure line and a low pressure line and including a valve member for communicating said lines with each other, a valve operator housing, a diaphragm dividing said housing into a lower chamber and an upper chamber and connected to said valve member, a pipe communicating said lower chamber with the output side of said valve structure, an upwardly opening receptacle in said upper chamber, means securing said receptacle to said diaphragm, a liquid in said receptacle, a float engaging in said liquid, tensionable means fixed to and extending upwardly from said float for normally urging said valve member to a predetermined open position, and means connected with said high pressure line and active when said tensionable means has moved said valve member beyond said predetermined open position for relieving said valve member from the tension of said tensionable means.

5. In combination a fluid pressure regulating valve structure for interposition between a high pressure line and a low pressure line and including a valve member for communicating said lines with each other, a valve operator housing, a diaphragm dividing said housing into a lower chamber and an upper chamber and connected to said valve member, a pipe communicating said lower chamber with the output side of said valve structure, an upwardly opening receptacle in said upper chamber, means securing said receptacle to said diaphragm, a liquid in said receptacle, a float engaging in said liquid, a pilot housing communicating with and extending from said operator housing, a cylinder carried by said pilot housing, a spring-pressed plunger slidable in said cylinder, a plunger rod connecting said plunger to said float, a valve structure in said pilot housing including a valve member operatively connected with said plunger rod for movement of said latter valve member to open position upon movement of said rod in one direction beyond a predetermined position, a pipe connecting said valve housing with said high pressure line whereby movement of said latter valve member to an open position will effect discharge of fluid under pressure from said high pressure line into said pilot housing to thereby retard movement of said first valve member beyond a predetermined open position, and means for gradually relieving the pressure in said pilot housing.

6. In combination a fluid pressure regulating valve structure for interposition between a high pressure line and a low pressure line and including a valve member for communicating said lines with each other, a valve operator housing, a diaphragm dividing said housing into a lower chamber and an upper chamber and connected to said valve member, a pipe communicating said lower chamber with the output side of said valve structure, a pilot housing communicating with and extending from said operator housing, a cylinder carried by said pilot housing, a spring-pressed plunger slidable in said cylinder, a plunger rod connected to said plunger, a flexible connection between said rod and said diaphragm, a valve structure in said pilot housing including a valve member operatively connected with said plunger rod for movement of said latter valve member to open position upon movement of said rod in one direction beyond a predetermined position, a pipe connecting said valve housing with said high pressure line whereby movement of said latter valve member to an open position will effect discharge of fluid under pressure from said high pressure line into said pilot housing to thereby retard movement of said first valve member beyond a predetermined open position, means for gradually relieving the pressure in said pilot housing and a weight carried by said diaphragm for gravitatingly urging said first valve member toward open position.

7. In a diaphragm operated valve structure having a diaphragm housing connected at one side thereof to the low pressure side of a fluid line; a regulator for said valve structure comprising a pilot housing secured at one end to said diaphragm housing, a combined wall and guide between the said housings, said wall having a reduced opening providing communication between the pilot housing and the upper side of said diaphragm housing, a plunger carried by said pilot housing, an operative connection between said plunger and the diaphragm, said connection being slidable through said guide, a downwardly opening valve housing in said pilot housing, a valve for said valve housing pivotally carried by said pilot housing and engageable with said connection whereby movement of said plunger in one direction will move said valve to open position and movement of said plunger in the opposite direction will move said valve to closed position, a pipe connected at one end to the high pressure side of said valve structure and at the other end to said valve housing, and a reducing valve interposed in said pipe.

8. In a diaphragm operated valve structure having a diaphragm housing connected at one side thereof to the low pressure side of a fluid line; a regulator for said valve structure comprising a pilot housing secured at one end to said diaphragm housing, a combined wall and guide between the said housings, said wall having a reduced opening providing communication between the pilot housing and the upper side of said diaphragm housing, a plunger carried by said pilot housing, an operative connection between said plunger and the diaphragm, said connection being slidable through said guide, a downwardly opening valve housing in said pilot housing, a valve for said valve housing pivotally carried by said pilot housing and engageable with said connection whereby movement of said plunger in one direction will move said valve to open position and movement of said plunger in the opposite direction will move said valve to closed position, a pipe connected at one end to the high pressure side of said valve structure and at the other end to said valve housing, a reducing valve interposed in said pipe, a vent pipe connected at one end to the upper side of said housing, and a pressure relieving means interposed in said vent pipe.

9. In a diaphragm operated valve structure having a diaphragm housing connected at one side thereof to the low pressure side of a fluid line; a regulator for said valve structure comprising a pilot housing secured at one end to said diaphragm housing, a combined wall and guide between the said housings, said wall having a reduced opening providing communication between the pilot housing and the upper side of said diaphragm housing, a plunger carried by said pilot housing, an operative connection between said plunger and the diaphragm, a downwardly opening valve housing in said pilot housing, said connection including a plunger rod fixed to said plunger and slidable through said guide, a spring connecting said rod with said diaphragm, a valve for said valve housing pivotally carried by said pilot housing and engageable with said connection whereby movement of said plunger in one direction will move said valve to open position and movement of said plunger in the opposite direction will move said valve to closed position, a pipe connected at one end to the high pressure side of said valve structure and at the other end to said valve housing, a reducing valve interposed in said pipe, a vent pipe connected at one end to the upper side of said housing, and a pressure relieving means interposed in said vent pipe.

WILLIAM B. COFFEE.